(12) United States Patent
Claessen (10) Patent No.: US 7,850,085 B2
(45) Date of Patent: Dec. 14, 2010

(54) BARCODE SCANNER WITH MIRROR ANTENNA

(75) Inventor: Albert M. Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 428 days.

(21) Appl. No.: 11/875,311

(22) Filed: Oct. 19, 2007

(65) Prior Publication Data

US 2009/0101717 A1    Apr. 23, 2009

(51) Int. Cl.
*G06K 7/10* (2006.01)
(52) U.S. Cl. ................................. 235/462.13
(58) Field of Classification Search ..................
235/462.01–462.49
See application file for complete search history.

(56) References Cited

U.S. PATENT DOCUMENTS 5,504,478 A * 4/1996 Knapp ................... 340/825.69

2002/0100805 A1   8/2002   Detwiler
2007/0063045 A1   3/2007   Acosta et al.

FOREIGN PATENT DOCUMENTS

DE    10 2005 040852    3/2007

\* cited by examiner

*Primary Examiner*—Daniel A Hess
(74) *Attorney, Agent, or Firm*—Paul W. Martin (57) ABSTRACT

An barcode scanner with a pattern mirror that doubles as a radio frequency identification (RFID) tag reader antenna to provide better overlap between barcode label and RFID tag reader reading zones. The barcode scanner includes at least one of pattern mirror with a conductive coating, and a radio frequency identification tag reader coupled to the conductive coating of the one pattern mirror. The conductive coating of the one pattern mirror functions as an antenna for the radio frequency identification tag reader.

20 Claims, 9 Drawing Sheets

BARCODE SCANNER WITH MIRROR ANTENNA

BACKGROUND

Barcode scanners are well known for their usefulness in identifying products. Barcode scanners may be equipped with add-on (internal or external in the checkout stand) radio frequency identification (RFID) tag readers, but barcode label and RFID tag reading zones do not coincide, resulting in operator confusion as to item placement. Further, finding space for a RFID tag reader antenna is a challenge.

It would be desirable to better integrate RFID tag readers with barcode scanners and provide better overlap between barcode label and RFID tag reading zones.

SUMMARY

A barcode scanner with mirror antenna is provided.

The barcode scanner includes at least one of pattern mirror with a conductive coating, and a radio frequency identification tag reader coupled to the conductive coating of the one pattern mirror. The conductive coating of the one pattern mirror functions as an antenna for the radio frequency identification tag reader.

DETAILED DESCRIPTION

Figure 1:
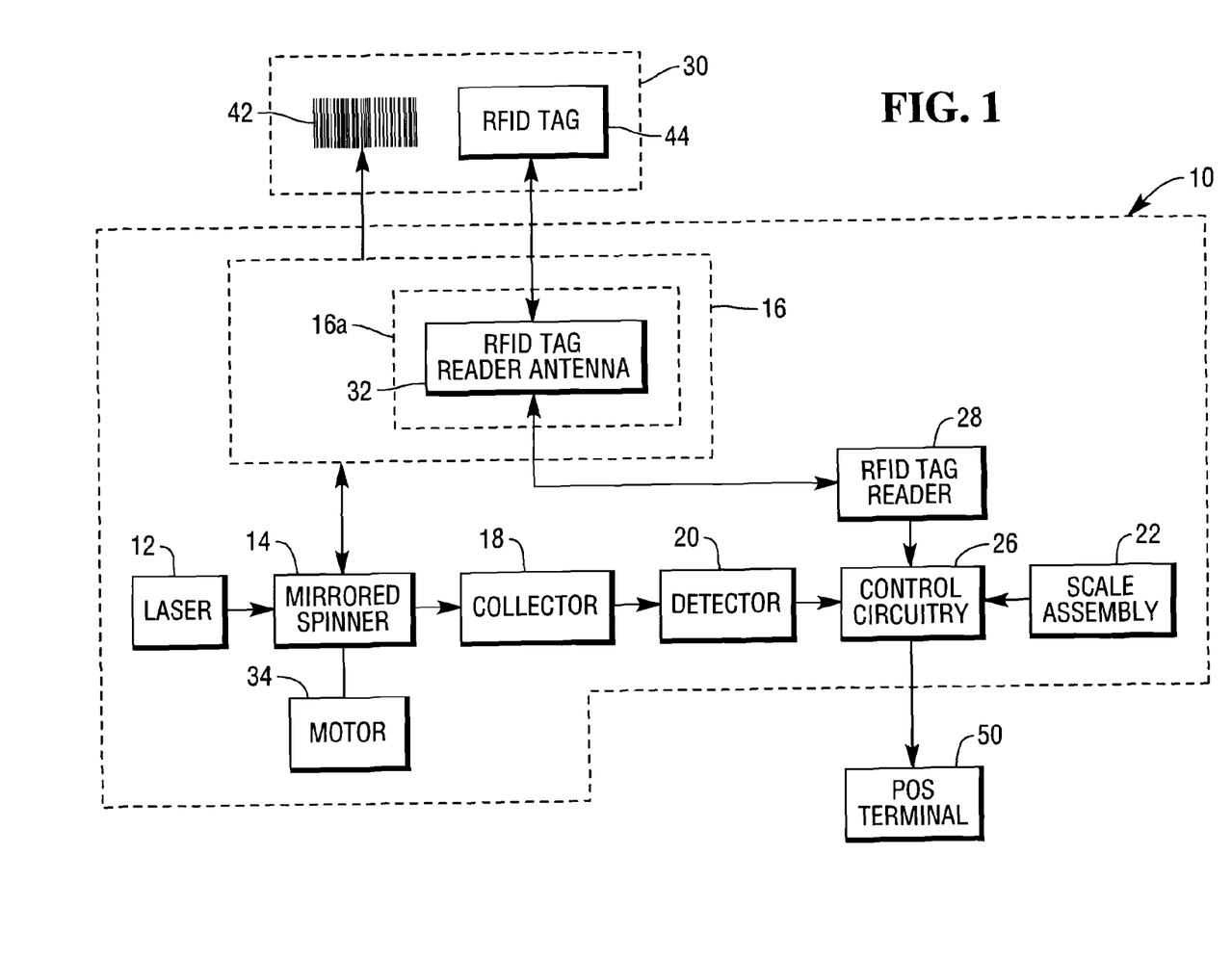
FIG. 1 is a block diagram of an example barcode scanner.

Referring now to FIG. 1, example barcode scanner 10 includes laser 12, mirrored spinner 14, pattern mirrors 16, collector 18, detector 20, scale assembly 22, weigh plate 24, and control circuitry 26. Barcode scanner 10 additionally includes radio frequency identification (RFID) tag reader 28.

Laser 12 generates a laser beam.

Mirrored spinner 14 directs the laser beam towards pattern mirrors 16 and directs light reflected from item 30 towards collector 18. Motor 34 rotates mirrored spinner 14.

Pattern mirrors 16 produce a pattern of scanning light beams for scanning barcode label 42 on item 30. Pattern mirrors 16 direct the laser beam towards item 30 and direct the light reflected from item 30 towards mirrored spinner 14.

Pattern mirrors 16 include pattern mirror 16a, which includes RFID tag reader antenna 32.

Figure 2:
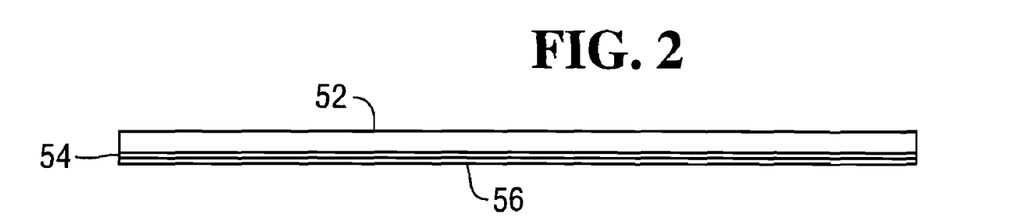
FIG. 2 illustrates layers of a pattern mirror.

With reference to FIG. 2, pattern mirrors 16 may include front surface mirrors, with a substrate 52 and an aluminum coating 54. Substrate 52 may be made of glass or plastic, but glass is typically preferred because of its superior flatness.

Pattern mirrors 16 may additionally be coated with a passivation layer 56 to prevent oxidation of the aluminum coating 54. Passivation layer 56 may include silicon oxide (quartz). Both the aluminum and passivation layers 54 and 56 may be applied to a glass substrate 52 by a vacuum deposition process.

In accordance with the present invention, the conductive aluminum coating 54 is used as an RFID tag reader antenna 32. Any of pattern mirrors 16 may serve this purpose, within a certain range of sizes and qualities, where quality depends on the conductivity of the aluminum coating 54 and the dielectric losses in substrate 52.

For a glass pattern mirror 16 to serve as pattern mirror 16a, the size range should be about four to six inches for the largest dimension. Plastic mirrors would be the larger sizes of the same range. The dielectric constant of most plastics is about 3, while glass can be as high as 10, resulting in smaller sizes for glass than plastic for the same frequency.

The suitability of any pattern mirror 16 also depends on dielectric effects of the plastic of mirror housing 72 (FIGS. 4, 9, and 10) and the means for mounting the pattern mirror 16 to mirror housing 72, such as glue, clips, or snaps.

If glue is used, the type of glue (dielectric constant), thickness of the glue, and coverage of the glue (whether it is applied to all of the surface or only partially) all affect the suitability.

The shape of a candidate pattern mirror 16 is also important because it determines signal polarization. RFID tags 44 are typically linearly polarized.

For a linearly polarized RFID tag reader antenna 32, the direction of the polarization of RFID tag reader antenna 32 must match that of the antenna in RFID tag 44 to achieve maximum read range. If the polarizations are crossed (horizontal-vertical), RFID tag reader 28 will not likely read RFID tag 44.

For a circularly polarized RFID tag reader antenna 32, the orientation of the tag antenna relative to RFID tag reader antenna 32 is not so critical. The maximum reception distance is less than that of a properly oriented linearly polarized RFID tag reader antenna 32, and the efficiency is reduced by 3 dB. The loss of efficiency associated with using a circularly polarized RFID tag reader antenna 32 is not significant as most commercial RFID tag readers 28 have powers and ranges which far exceed the range required to read an RFID tag 44 on an item 30 within the barcode scanning zone of scanner 10. In fact, the power of RFID label reader 28 may have to be reduced to prevent reading of RFID tags 44 outside the barcode scanning zone of scanner 10 (in shopping carts and adjacent checkout lanes).

Returning to FIG. 1, collector 18 directs the light reflected from item 30 towards detector 20.

Detector 20 converts the light reflected from item 30 into electrical signals.

Scale assembly 22 produces electrical signals based upon the weight of produce items. Scale assembly 22 may include a load cell or other weight measuring device and a weigh plate.

Item 30 may be labeled only with barcode label 42, only with RFID tag 44, or both.

RFID tag reader 28 wirelessly interrogates RFID tag 44 on item 30. RFID tag reader 28 operates in the Industrial, Scientific, and Medical (ISM) band (860 MHz in Europe, 902-928 MHz in the United States). RFID tag reader 28 couples to RFID tag reader antenna 32 through a wired or wireless connection.

Control circuitry 26 controls operation of barcode scanner 10. Control circuitry 26 receives electrical signals from detector 20 and determines item identification information stored within barcode label 42. Control circuitry 26 receives weight signals from scale assembly 22. Control circuitry 26 receives item identification information stored within RFID tag 44 from RFID tag reader 28. Control circuitry 26 sends weight information and item identification information to point-of-sale (POS) terminal 50.

POS terminal 50 determines a price of item 30 based upon the item identification information. POS terminal 50 also determines prices of produce items based upon the weight information and produce identification information entered into POS terminal 50 by an operator.

Figure 3:
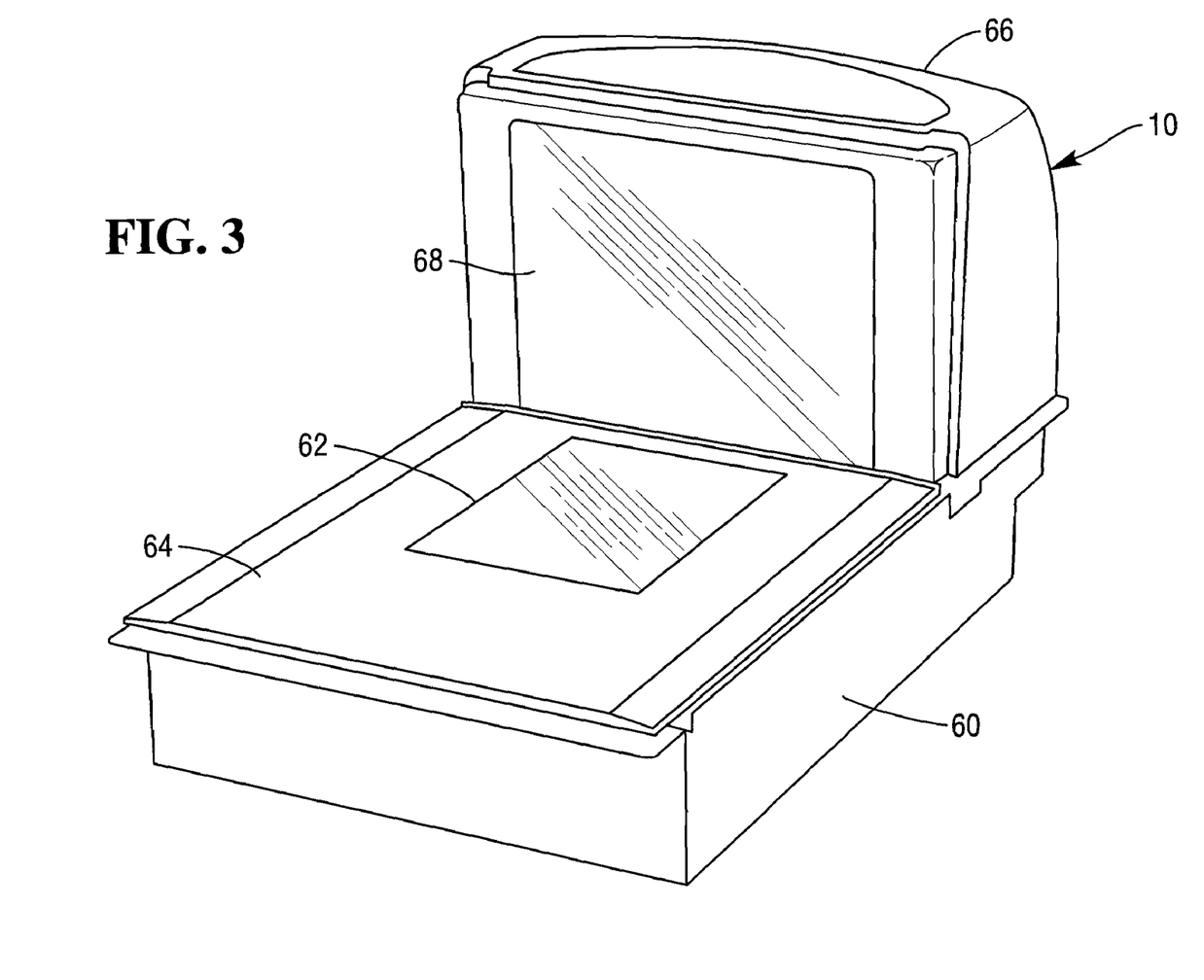
FIG. 3 is a perspective view of an example barcode scanner.

With reference to FIG. 3, an example barcode scanner 10 is illustrated. Example barcode scanner 10 is a dual-aperture barcode scanner.

Example barcode scanner 10 includes a first housing portion 60 and a second housing portion 66. Pattern mirrors 16 are located in both first housing portion 60 and second housing portion 66 for scanning an item from a plurality of different directions.

Housing portion 60 includes substantially horizontal aperture 62. Substantially horizontal aperture 62 may be located in a scale weigh plate 64.

Housing portion 66 includes substantially vertical aperture 68. Cover portion 70, when removed, exposes a mirror housing 72 (FIG. 3).

Example barcode scanner 10 directs scanning light beams from laser 12 through substantially horizontal and vertical apertures 62 and 68 for illuminating item 30 from a plurality of different sides and angles. In this way, example barcode scanner 10 has a high probability of reading barcode label 42 during a first pass of item 30 over scanner 10.

Figure 4:
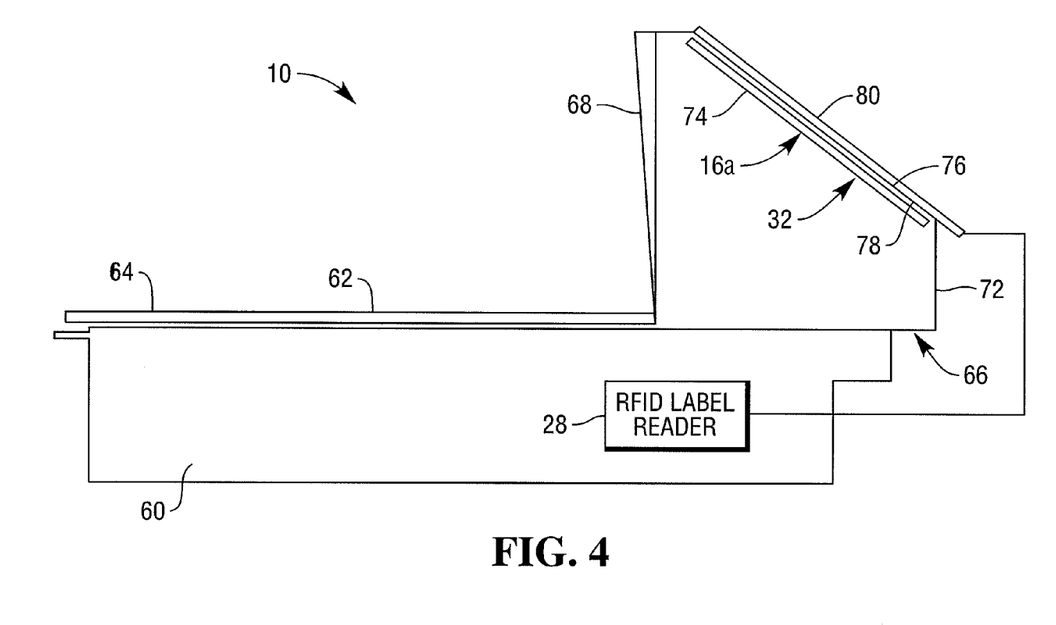
FIG. 4 is a cross-sectional view of the barcode scanner of FIG. 3 with a cover portion removed.
Figure 5:
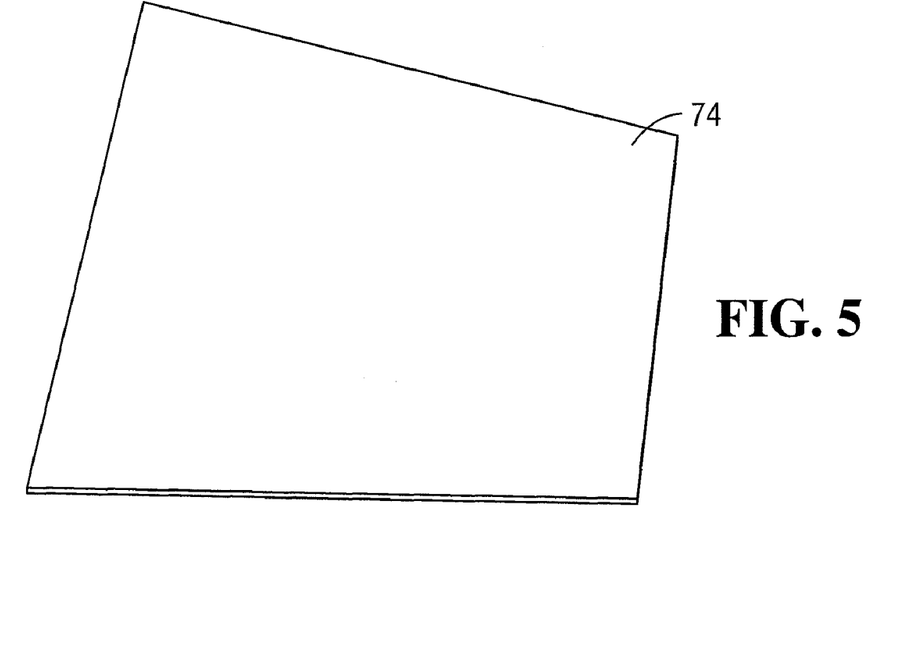
FIG. 5 is a view of an example pattern mirror including a radio frequency identification (RFID) tag reader antenna.

With reference to FIGS. 4-5, one choice for pattern mirror 16a is a large pattern mirror 74 (FIG. 5). Pattern mirror 74 is mounted to an inside surface 78 of mirror housing 72 within housing portion 66. Mirror housing 72 is made of plastic. Pattern mirror 74 functions to direct the scanning light beams in a diagonal downward direction towards a top surface of item 30.

Pattern mirror 74 is a good choice for pattern mirror 16a. Pattern mirror 74 is one of the largest pattern mirrors 16 in scanner 10. Pattern mirror 74 also has a trapezoidal shape that is close enough to a square shape to provide RFID tag reader antenna 32 with a polarization that is close to circular. Pattern mirror 74 has the correct size to achieve a correct resonating frequency for an antenna operating with the range of RFID frequencies. Also, pattern mirror 74 is located such that it faces the center of the intended RFID scan zone, over substantially horizontal aperture 62 of weigh plate 64 and in front of substantially vertical aperture 68 of second housing portion 66.

Use of pattern mirror 74 results in an antenna pattern that is hemispherical and centered over the weigh plate 64. The antenna pattern is influenced by the metallic parts of scanner 10, such as weigh plate 64, a metal chassis within first housing portion 60, metal components in second housing portion 66, and electronic article surveillance (EAS) coils, if installed, around one or both of apertures 62 and 68. This metal in the vicinity of pattern mirror 74 limits the RFID tag reading zone to approximately the barcode scanning zone, such that RFID tags on items 30 in shopping carts or over scanners 10 in adjacent lanes are not read by RFID tag reader 28 in a present lane.

The large size of pattern mirror 74 facilitates wireless coupling of an RF signal from RFID tag reader 28 to RFID tag reader antenna 32 through mirror housing 72 without a need for major changes to mirror housing 72, such as drilling holes for connectors and cables that would pass from the backside surface 76 to the inside surface 78 of mirror housing 72.

Figure 8:
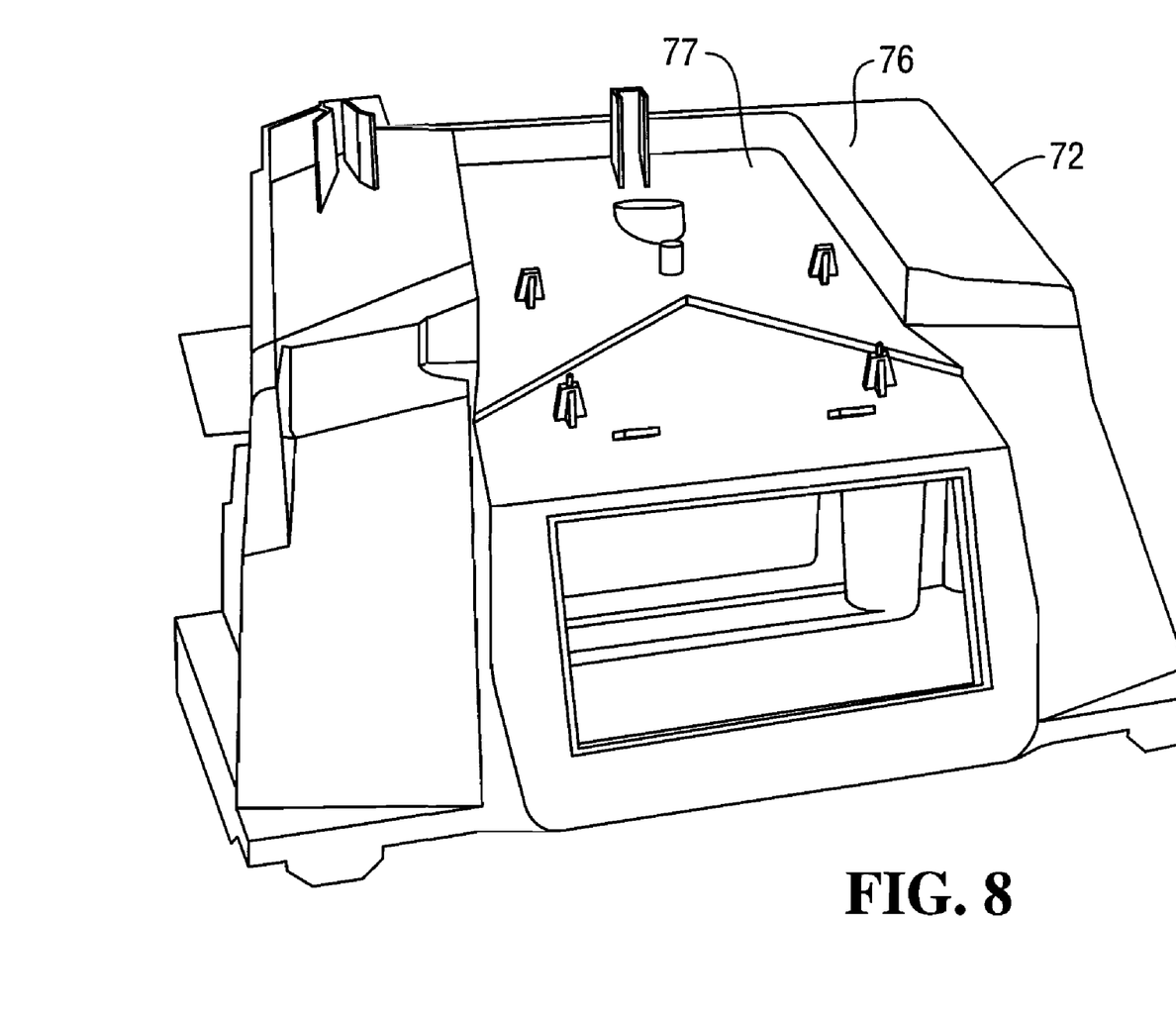
FIG. 8 is a view illustrating a back surface of a mirror housing which is aperture side down.
Figure 9:
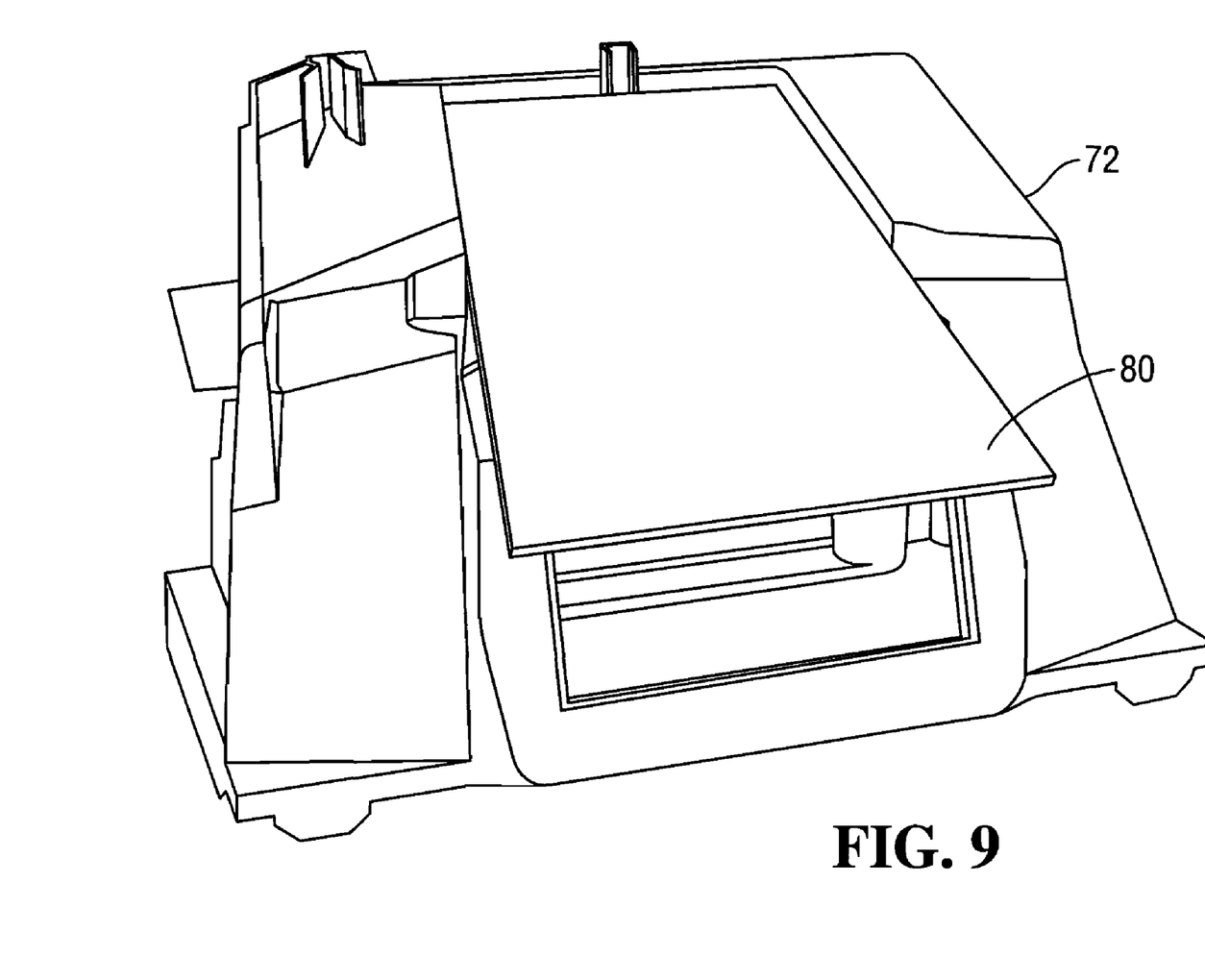
FIG. 9 is a view illustrating the back surface of the mirror housing of FIG. 8, with a resonator mounted in an example location.

Excitation of RFID tag reader antenna 32 may be provided by a resonator 80. Resonator 80 may include an additional antenna or ground-plane on backside surface 76 of mirror housing 72, opposite mirror 74. Resonator 80 may take the form of a conductive coating on backside surface 76 or a sheet of metal (preferably copper or aluminum) attached to backside surface 76 (FIGS. 8 and 9). In an example configuration, backside surface 76 includes a recess 77 which accommodates placement of resonator 80.

Figure 6:
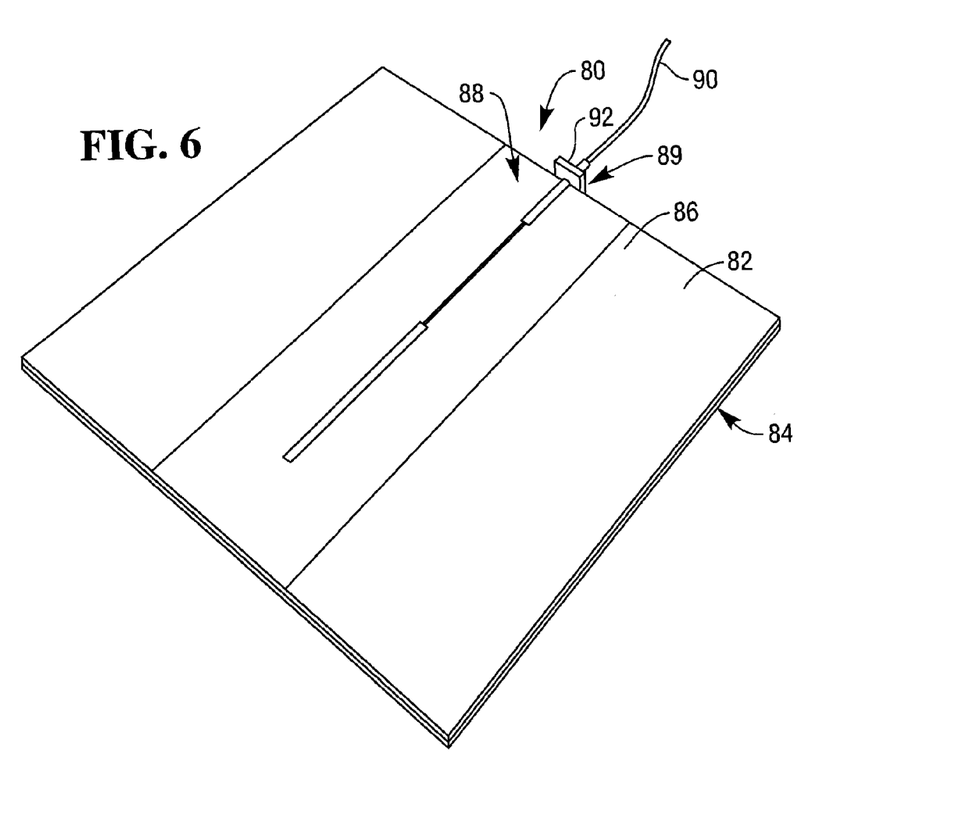
FIG. 6 is a view illustrating a top side of an example resonator.
Figure 7:
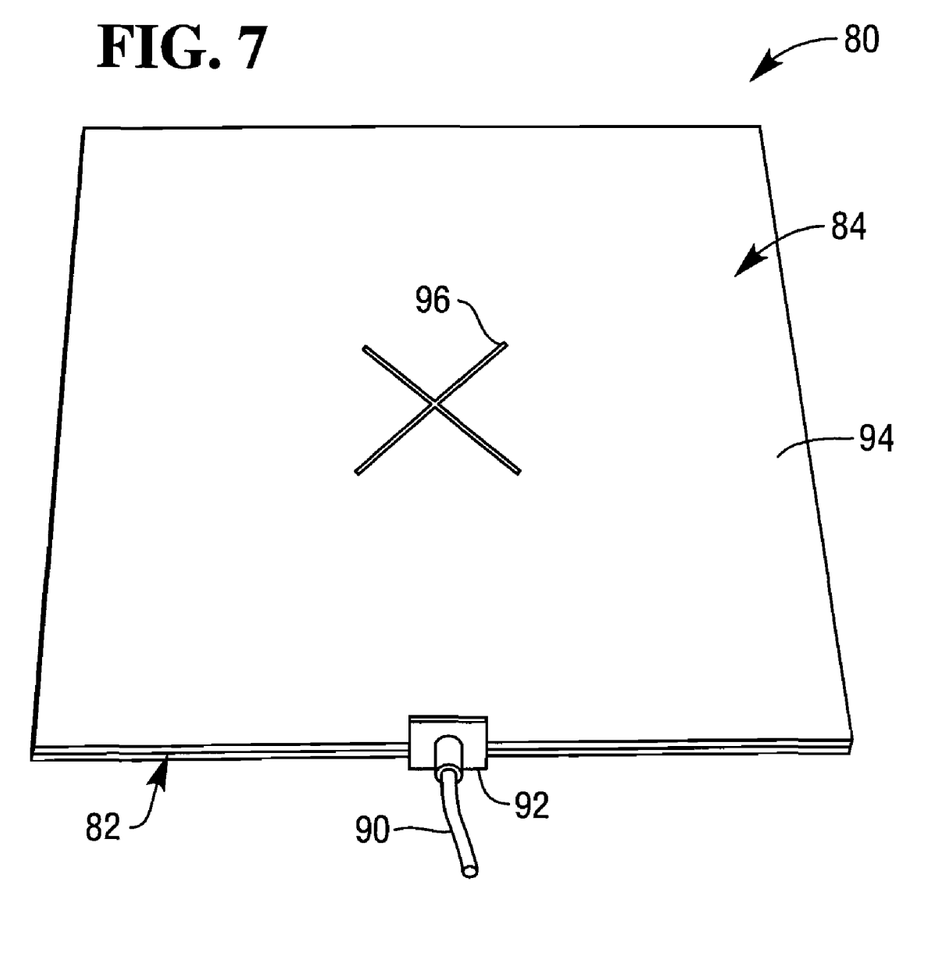
FIG. 7 is a view illustrating an example bottom side of the resonator of FIG. 6.

With reference to FIGS. 6-7, an example resonator 80 is illustrated. In this example, resonator 80 includes a top layer 82 and a bottom layer 84. Top layer 82 includes a drive circuit 88 including a transmission line 89 on a printed circuit board 86, such as a standard FR4 printed circuit board.

An example second layer 84 (FIG. 7) includes a ground plane 94 with slot 96 in the center. Transmission line 89 crosses over slot 96. Slot 96 is an interruption in ground plane 94 which force the current of the wave traveling in transmission line 89 to "disconnect" from the wave, resulting in radiation off the back of ground plane 94.

A linear slot 96 would be the simplest structure. However, if the amount of coupling desired would require a linear slot 96 that starts approaching half a wavelength in length, then the linear slot 96 may start acting as an antenna and radiate both off the front and back of ground plane 94.

To counteract this, the shape can be changed such that the current still travels a large distance but the overall dimensions of slot 96 stay well below half a wavelength. An "X" or "H" shaped slot 96 can be used for that purpose.

The slot size, the position where transmission line 89 crosses slot 96, as well as the length of transmission line 89 beyond slot 96, are all parameters that affect impedance. These parameters can be varied to achieve an antenna input impedance as close as possible to match the impedance of transmission line 89, and thus maximize the energy coupled to and from (receiving) RFID tag reader antenna 32.

Ground plane 94 should be larger than RFID tag reader antenna 32 in order to avoid backside radiation of energy away from the barcode label reading zone by RFID tag reader antenna 32 that would degrade performance of RFID tag reader antenna Drive circuit 88 includes coaxial coupling 92, which couples an RF signal wire in coaxial cable 90 to transmission line 89 and a ground sheath to ground plane 94 in an unbalanced configuration. A balanced configuration drive circuit with two coaxial couplings (positive and negative signals) on opposite ends of transmission line 89 is also envisioned.

Resonator 80 is mounted either with fasteners into standoffs or snaps on the backside surface 76 of mirror housing 72. Resonator 80 is mounted with ground plane 94 facing downward towards pattern mirror 16a.

For small pattern mirrors 16a (about four inches long), ground plane 94 should be within about 0.25 mm of the backside of the small pattern mirror 16a to operate at the desired frequency range of 902 to 928 MHz. For large pattern mirrors 16a (about five to six inches), the ground plane should be within about five to ten millimeters of the backside of the large pattern mirror 16a to operate at the desired frequency range of 902 to 928 MHz.

In operation, an RF signal from RFID tag reader 28 travels over coaxial cable 90 and through coupling 92 to transmission line 89. Ground plane 90 radiates the energy of the RF signal to pattern mirror 16a. The aluminum coating 54 re-radiates the energy into the barcode label reading zone of scanner 10, with the RFID tag reading zone and the barcode label reading zone substantially overlapping. Pattern mirror 16*a* receives a return RF signal from RFID tag 44 and radiates the energy in the return RF signal to resonator 80 and transmission line 89. Transmission line 89 sends the return signal to RFID tag reader 28 over coaxial cable 90.

Although particular reference has been made to certain embodiments, variations and modifications are also envisioned within the spirit and scope of the following claims.

The invention claimed is:

1. A radio frequency identification tag reader system suitable for use in a barcode scanner comprising:
 a mirror for reflecting a laser beam including a conductive coating; and
 a radio frequency identification tag reader coupled to the conductive coating of the mirror for reading radio frequency identification tags on products to identify the products.

2. The system of claim 1, wherein the radio frequency identification tag reader is wirelessly coupled to the conductive coating of the mirror.

3. The system of claim 2, further comprising a resonator for coupling the conductive coating to the radio frequency identification tag reader.

4. The system of claim 3, wherein the resonator comprises a ground plane with a slot and a transmission line coupled to the radio frequency identification tag reader on the ground plane over the slot.

5. A barcode scanner comprising:
 at least one of pattern mirror with a conductive coating; and
 a radio frequency identification tag reader coupled to the conductive coating of the one pattern mirror for reading radio frequency identification tags on products to identify the products;
 wherein the conductive coating of the one pattern mirror functions as an antenna for the radio frequency identification tag reader.

6. A barcode scanner comprising:
 a laser for producing a laser beam;
 a plurality of pattern mirrors for producing a scan pattern from the laser beam for scanning an item and for receiving light reflected from the item, wherein at least one of the pattern mirrors includes a conductive coating;
 a mirrored spinner for directing the laser beam at the pattern mirrors and for directing the light reflected from the item;
 a detector for converting the light reflected from the item into electrical signals;
 a collector for receiving the light reflected from the item from the mirrored spinner and for focusing it on the detector;
 a radio frequency identification tag reader;
 wherein the radio frequency identification tag reader is coupled to the one pattern mirror and the conductive coating of the one pattern mirror functions as an antenna; and
 control circuitry for decoding a barcode label if present on the item to obtain information about the item from the electrical signals, for obtaining the information about the item from the radio frequency identification tag reader if a radio frequency identification tag is present on the item, and for sending the information about the item to a computer.

7. The barcode scanner of claim 6, wherein the scan pattern produces a barcode label reading zone, the radio frequency identification tag reader produces a radio frequency identification tag reading zone, and wherein the radio frequency identification tag reading zone substantially overlaps the barcode label reading zone.

8. The barcode scanner of claim 6, wherein the barcode scanner comprises a first housing portion containing a substantially horizontal aperture for scanning the item from a first plurality of directions, and a second housing portion containing a substantially vertical aperture for scanning the item from a second plurality of directions.

9. The barcode scanner of claim 8, wherein the one pattern mirror is located in the second housing portion.

10. The barcode scanner of claim 9, wherein the one pattern mirror directs the laser beam towards a top surface of the item.

11. The barcode scanner of claim 10, further comprising:
 a mirror housing in the second housing portion, wherein the mirror housing includes an inside surface and an outside surface and the one pattern mirror is mounted to the inside surface; and
 a resonator for wirelessly coupling the radio frequency identification tag reader to the one pattern mirror, wherein the resonator is mounted to the outside surface opposite the one pattern mirror.

12. The barcode scanner of claim 6, further comprising a resonator for wirelessly coupling the radio frequency identification tag reader to the one pattern mirror.

13. The barcode scanner of claim 12, wherein the resonator comprises a ground plane and a drive circuit over the ground plane.

14. The barcode scanner of claim 13, wherein the ground plane includes a slot and the drive circuit includes a transmission line over the slot.

15. The barcode scanner of claim 14, wherein the drive circuit is a balanced drive circuit.

16. The barcode scanner of claim 14, wherein the drive circuit is an unbalanced drive circuit.

17. The barcode scanner of claim 12, wherein the resonator is located parallel to the one pattern mirror.

18. The barcode scanner of claim 17, wherein the resonator has a first area, the one pattern mirror has a second area, and the first area of the resonator is larger than the second area of the one pattern mirror.

19. A barcode scanner comprising:
 a housing including a first housing portion containing a substantially horizontal aperture, and a second housing portion containing a substantially vertical aperture;
 a laser in the housing for producing a laser beam;
 a plurality of pattern mirrors in the housing including a first set of pattern mirrors in the first housing portion for scanning an item from a first plurality of directions, and a second set of pattern mirrors in the second housing portion for scanning the item from a second plurality of directions;
 wherein the second set of pattern mirrors includes at least one mirror for directing the laser beam diagonally down for scanning a top surface of the item, and wherein the one mirror includes a conductive coating which functions as an antenna;
 a mirrored spinner in the housing for directing the laser beam at the pattern mirrors and for directing the light reflected from the item;
 a detector in the housing for converting the light reflected from the item into electrical signals;
 a collector in the housing for receiving the light reflected from the item from the mirrored spinner and for focusing it on the detector;
 a radio frequency identification tag reader;

a resonator including a ground plane and a drive circuit coupled to the radio frequency identification tag reader over the ground plane;

wherein the resonator has a first area, the one pattern mirror has a second area, and the first area of the resonator is larger than the second area of the one pattern mirror;

wherein the second housing portion includes a mirror housing having an inside surface and an outside surface, and wherein the one pattern mirror is mounted to the inside surface and the resonator is mounted to the outside surface opposite the one pattern mirror; and control circuitry for decoding a barcode label if present on the item to obtain information about the item from the electrical signals, for obtaining the information about the item from the radio frequency identification tag reader if a radio frequency identification tag is present on the item, and for sending the information about the item to a computer.

20. A radio frequency identification tag reader system suitable for use in a barcode scanner comprising:

a mirror for reflecting a laser beam including a conductive coating;

a radio frequency identification tag reader; and a resonator for wirelessly coupling the conductive coating to the radio frequency identification tag reader;

wherein the resonator comprises a ground plane with a slot and a transmission line coupled to the radio frequency identification tag reader on the ground plane over the slot.

* * * * *